July 29, 1930.	L. D. SOUBIER	1,771,864
GLASS WORKING TANK
Filed Jan. 28, 1927	6 Sheets-Sheet 4
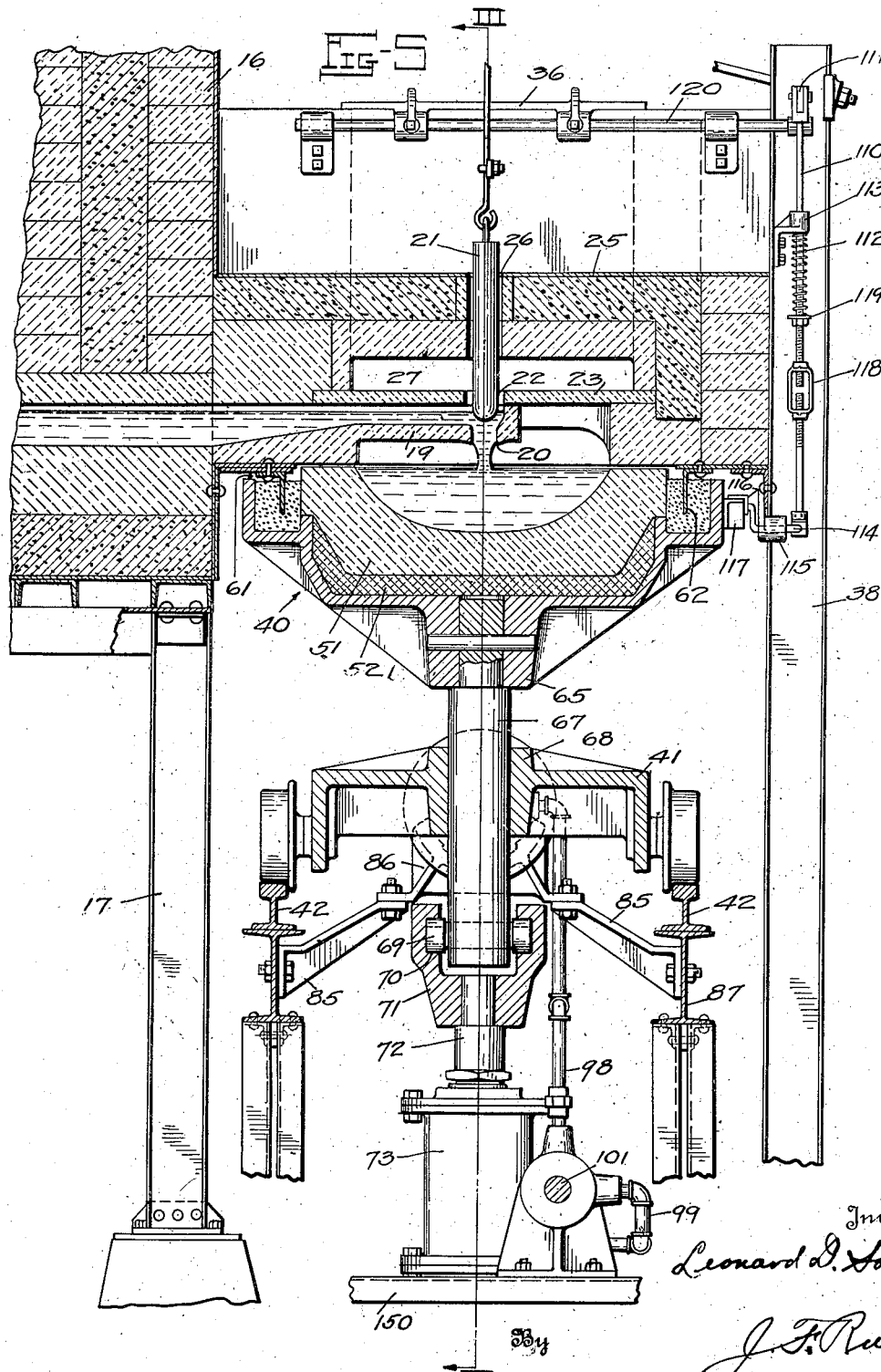

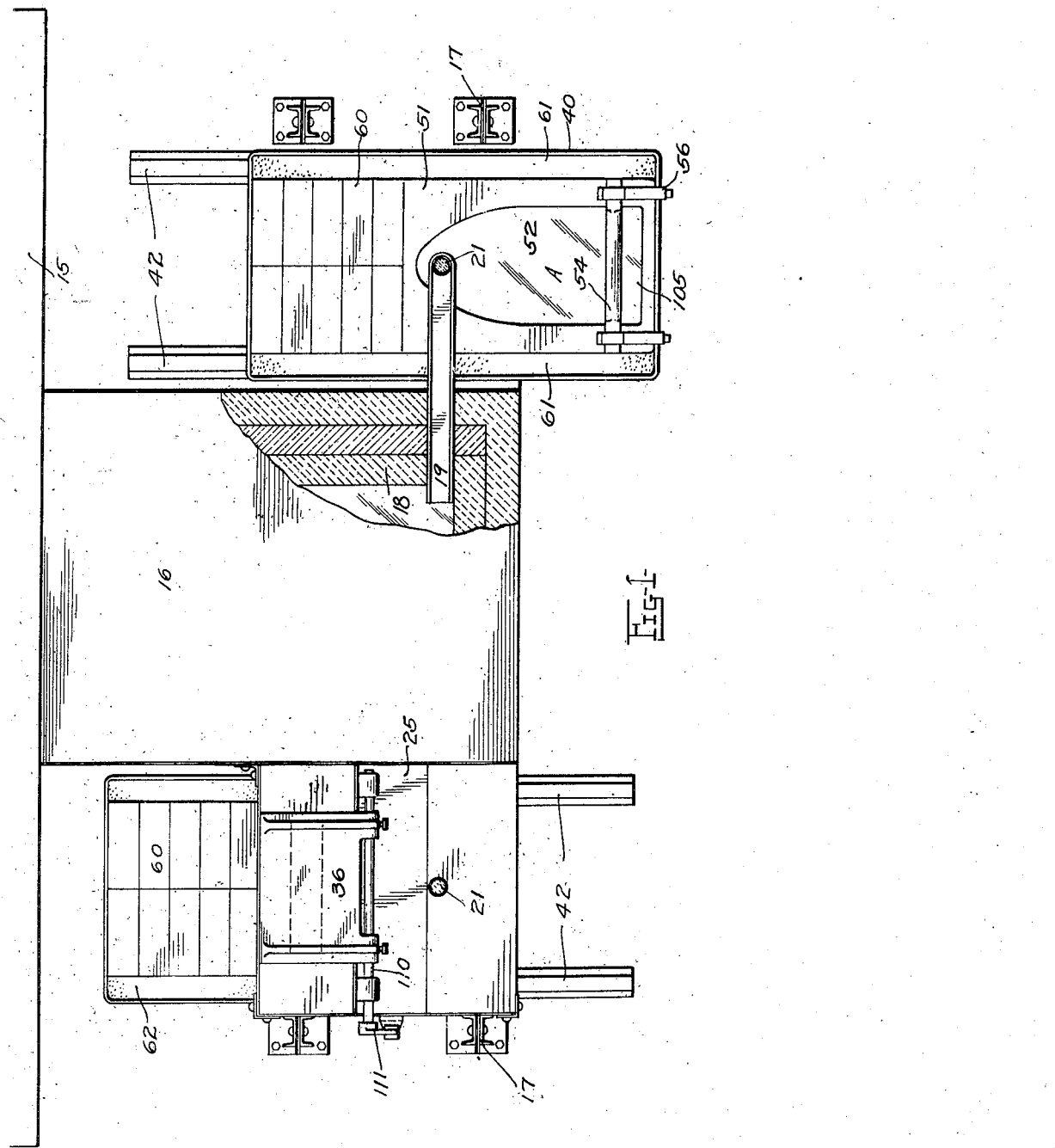

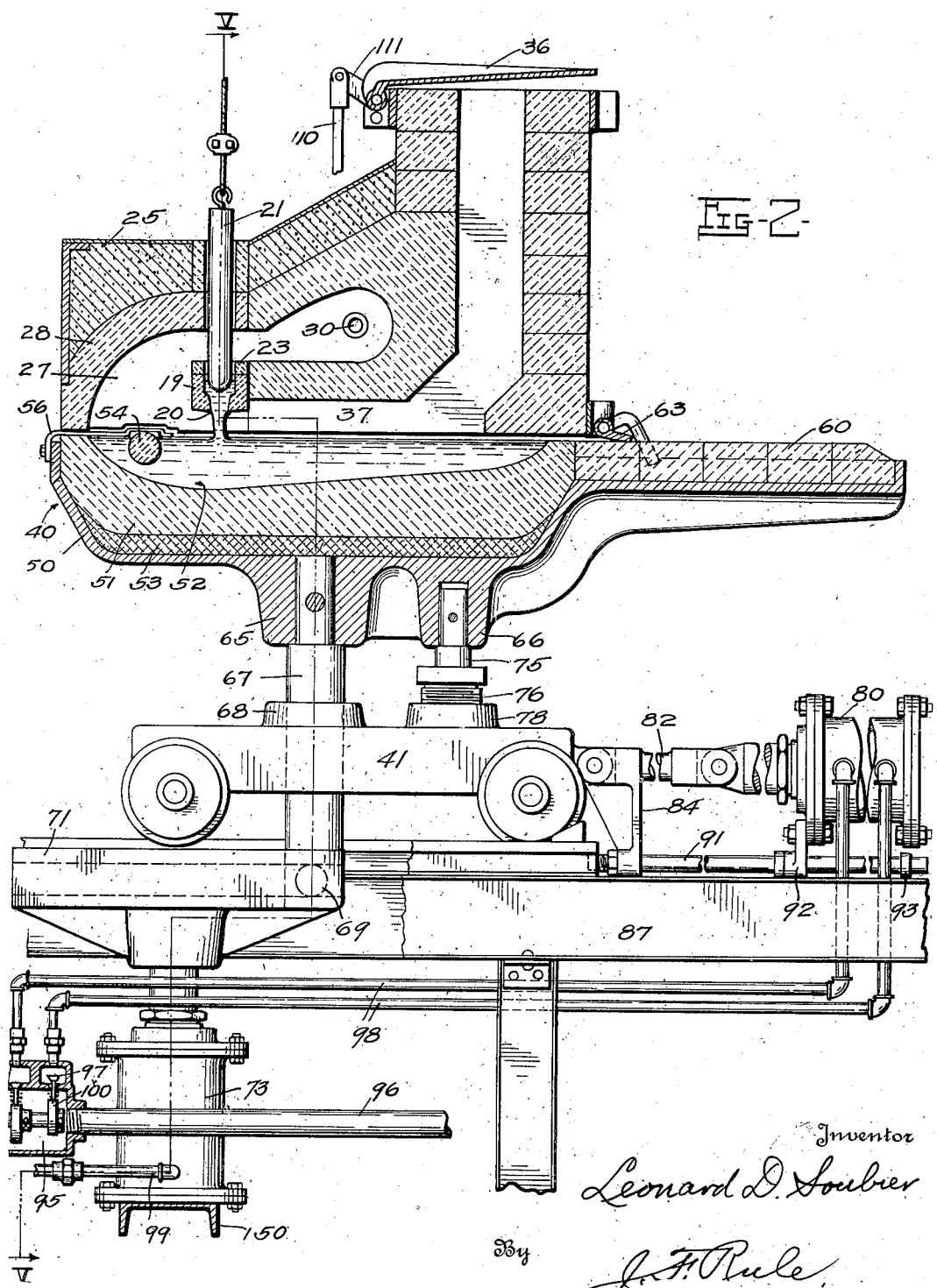

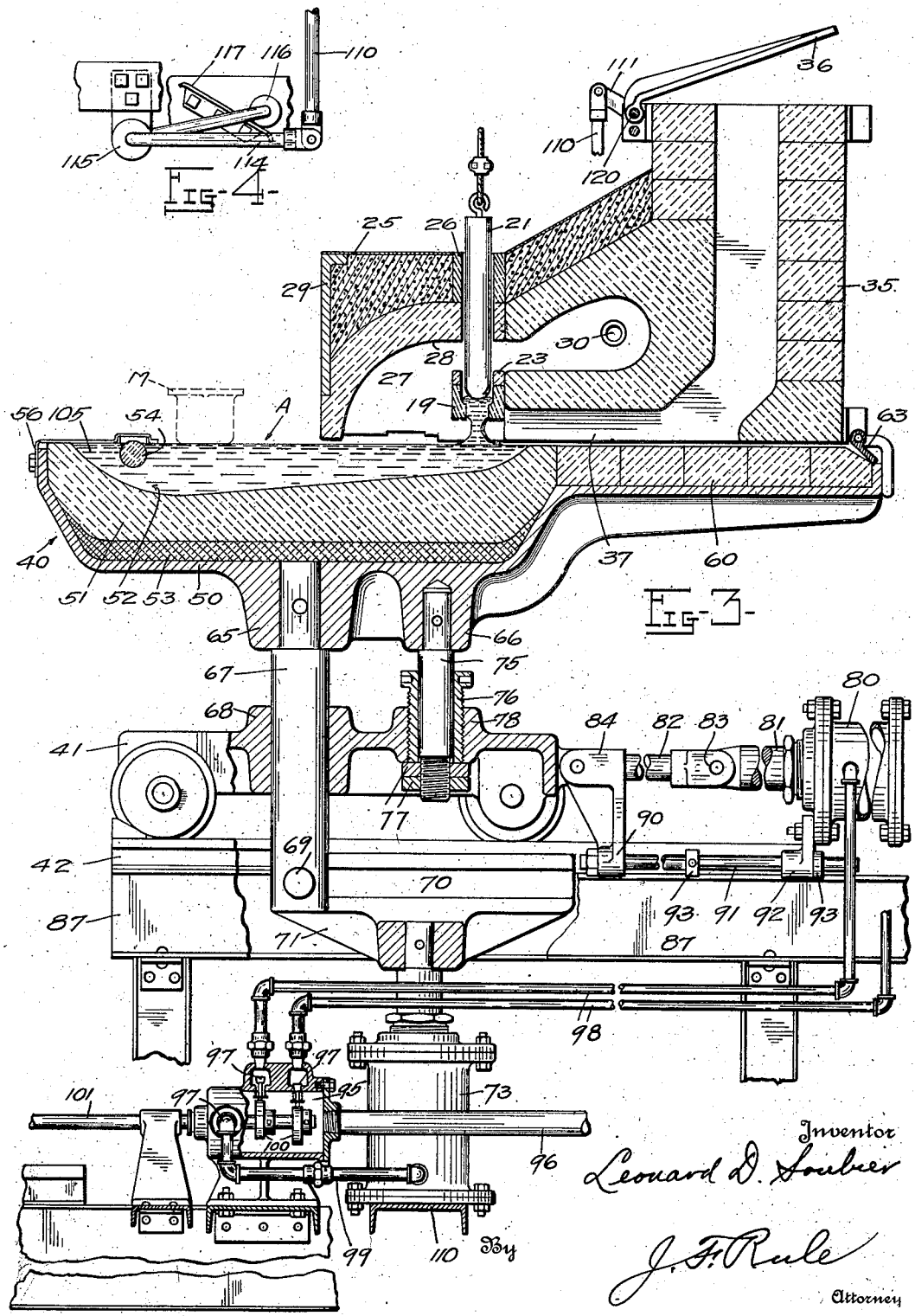

July 29, 1930. L. D. SOUBIER 1,771,864
GLASS WORKING TANK
Filed Jan. 28, 1927 6 Sheets-Sheet 5
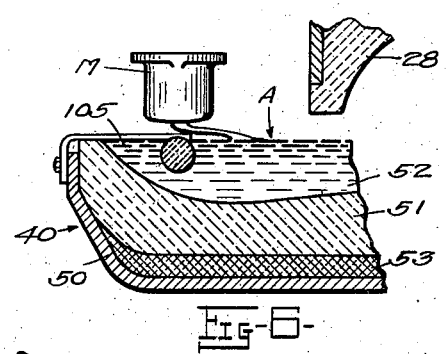
Fig-6-
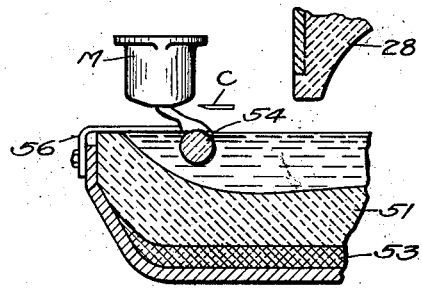
Fig-7-
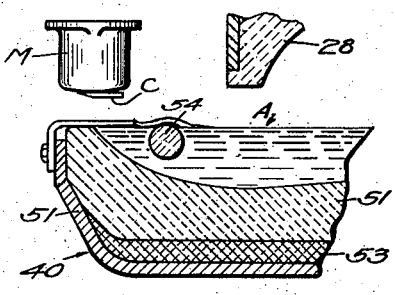
Fig-8-
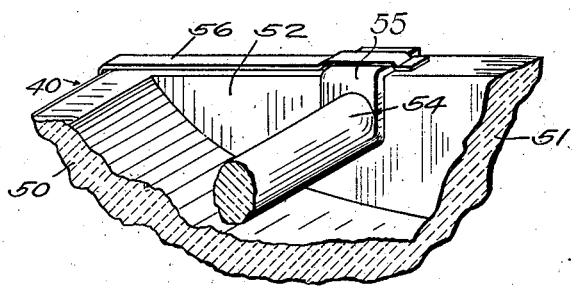
Fig-9-
Inventor
Leonard D. Soubier
By J. F. Rule
Attorney July 29, 1930. L. D. SOUBIER 1,771,864
GLASS WORKING TANK
Filed Jan. 28, 1927 6 Sheets-Sheet 6
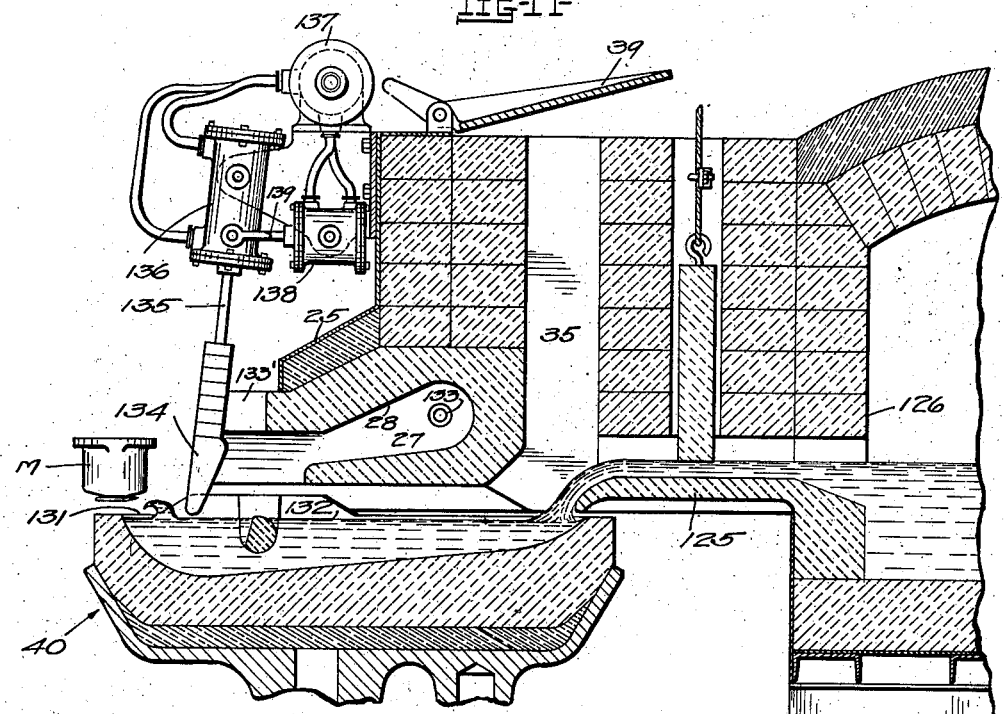
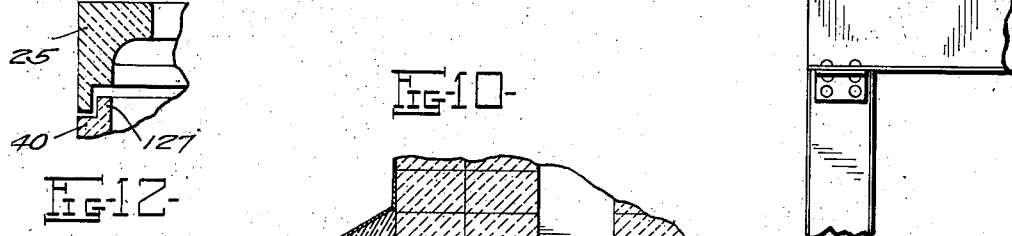
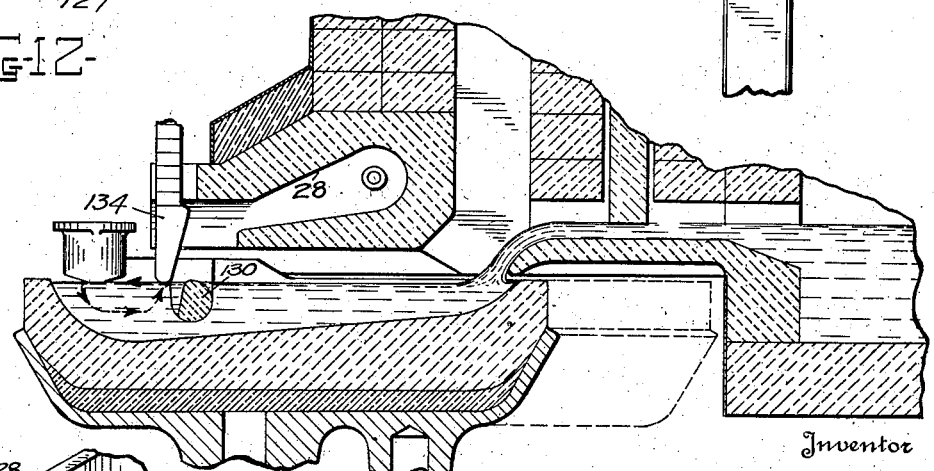
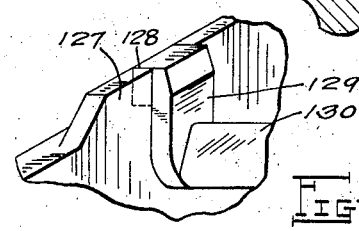

Patented July 29, 1930

1,771,864

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

GLASS-WORKING TANK

Application filed January 28, 1927. Serial No. 164,141.

The present invention relates to improvements in glass working tanks from which charges of molten glass are gathered directly into forming molds by suction.

An object of the invention is to provide a glass working tank in which charge gathering engagement between the molten glass in the tank and a forming mold is effected solely by movement of the tank.

Another object of the invention is to provide a glass working tank whose movement provides the sole means for bringing the glass into charge gathering engagement with a forming mold and to so construct the tank that movement of the latter away from a gathering mold, together with operation of a cut-off knife, causes deposit of chilled cut-off portions of glass into a closed cut-off area for reheating and re-assimilation by the main body of glass before again reaching a position to be gathered by a mold.

A further object of the invention is to provide a glass working tank having combined horizontal and vertical movements by which said tank is moved along a predetermined path and simultaneously moved vertically upward as it approaches the ends of said path, thereby bringing molten glass contained in the tank into charge gathering engagement with a mold at one station, and into a position for reheating at another station.

A still further object is to provide in a tank of the above type, means whereby the degree of vertical movement of the tank may be varied to thereby control the extent to which a gathering mold dips into the glass, and the relative position of the glass in the tank to a heating means.

It is likewise an object of the present invention to provide a reciprocable working tank to contain molten glass, said tank divided into a gathering area and cut-off receiving area, and an impelling device operating between the charge gathering periods to remove chilled cut-off portions of glass from the gathering area into said cut-off receiving area.

Other objects of the invention will appear hereinafter.

In the accompanying drawings:

Fig. 1 is a plan view of a tank extension arranged to supply molten glass to two working tanks of the type constituting the present invention, parts being broken away in section illustrating the connection between the extension and tanks.

Fig. 2 is a central vertical sectional view showing the tank in a position permitting reheating of the glass in the gathering area and illustrating one form of mechanism for reciprocating and raising and lowering the tank.

Fig. 3 is a view similar to Fig. 2 taken on the line III—III of Fig. 5 but shows the tank in its outermost position, exposing the gathering area so that a charge or charges may be gathered by a mold.

Fig. 4 is a detail view of the automatic damper control.

Fig. 5 is a vertical sectional view taken substantially on the line V—V of Fig. 2.

Fig. 6 is a detail sectional view illustrating the effect of lowering the tank away from the stationary mold.

Fig. 7 is a view similar to Fig. 6, showing a further downward and inward movement of the tank by which the tail of chilled glass is carried away from the gathering area.

Fig. 8 shows the final step in which the tail of chilled glass is deposited in the cut-off receiving area.

Fig. 9 is a detail perspective view showing one means for securing the dam in position.

Fig. 10 is a vertical longitudinal sectional view showing another form of the invention wherein a periodically operated paddle removes chilled glass from the gathering area to the cut-off area.

Fig. 11 is a view similar to Fig. 10, but shows the paddle about to start a glass moving operation.

Fig. 12 is a detail transverse sectional view showing the formation of the adjacent faces of the tank side walls and the hood.

Fig. 13 is a detail fragmentary perspective view showing the manner in which the modified form of dam is supported.

Throughout the specification and claims

"cut-off area" or "cut-off receiving area" has reference to that portion separate from the remainder of the tank and adapted to receive the chilled portions or tails of glass severed from the gathering mold.

Referring to the drawings, the furnace or refining tank 15 is formed with a lateral extension 16 supported upon a suitable framework 17 and having side walls 18 formed of firebrick and insulating material, in any approved manner. This extension may accommodate several working tanks, the present application showing one tank at each side, receiving its supply of molten glass from the furnace extension 16 by way of a trough 19 having a bottom outlet opening 20 over which is arranged a flow regulator 21, said regulator extending downward through an opening 22 in a refractory cover 23 (Figs. 3 and 5).

A hood 25 extends laterally from each side of the extension 16, entirely encloses the trough 19, and at periodic time intervals encloses the front end portion of a glass tank or container as will be hereinafter pointed out. This hood 25 is formed with an opening 26 vertically aligned with the outlet opening 20 in the trough 19 to accommodate the flow regulator 21. A combustion chamber 27 is formed within the hood 25, the wall 28 of the combustion chamber being formed of any suitable refractory material properly insulated, and supported by a casting 29. An injector 30 projects into the combustion chamber 27 (Fig. 3) and is so located that the products of combustion pass over the nose portion of the trough 19 in their movement toward the glass in the tank. Rearwardly of the combustion chamber 27, is arranged a stack 35 equipped with a draft control damper 36. This stack communicates directly with the forward end of the combustion chamber 27 by way of an elongated horizontal passageway 37, the combined length of said passageway and the combustion chamber being substantially equal to that of the mass of molten glass in a tank (Fig. 2). Such a relation of the combustion chamber, passageway 37 to the stack, and the body of molten glass insures direct heating of the entire surface of the body of glass, including the chilled cut-off portions in the cut-off area 105. Channel iron columns 38 or the like units support the hood and stack (Fig. 5).

A working tank 40 is located below the hood and stack and is mounted upon a wheeled carrier or carriage 41 adapted to travel in a horizontal path along tracks 42 spaced below the hood 25 and stack 35. This tank comprises an elongated metal casting 50 having a relatively deep front portion in which a refractory lining block 51 is placed, said block having an elongated cavity 52 in its upper side into which the molten glass is delivered by the trough 19 and from which charges are periodically gathered by a suction mold "M". A suitable insulating material 53 is interposed between the refractory block 51 and the casting 50. Adjacent the front or outer end of the tank, a dam 54 is arranged transversely of the recess 52 (Figs. 1 and 8) to provide a cut-off area 105 to receive chilled cut-off portions of glass removed from the gathering area. This dam, which consists of a bar of refractory material, is formed with and supported by angular arms 55 which rest upon the side walls of the tank and are held against accidental displacement by clamps 56 which may be separably connected to the front end of the casting 50 (Fig. 3). The rear portion of the casting 50 is elevated above the front portion (Fig. 3) and lined with firebrick 60, which firebrick at times forms the bottom wall of the passageway 37 through which products of combustion move from the combustion chamber 27 to the stack 35. The firebrick 60 and the liner block 51 are of slightly less width than that of the casting or supporting frame 50 to provide longitudinal channels 61 along the top side portions of the tank, said channels containing sand or the like material and forming with depending angle iron members 62, a sand seal which materially decreases the loss of heat. These angle iron members 62 may be fixed to the frame 38. The sand seal also materially assists in the maintenance of proper draft conditions by minimizing, if not preventing, circulation of cold outside air through the space over the working tank. As a means for further assisting in maintaining proper control of draft conditions, a hinged damper 63 is arranged transversely at the base of the stack 35 and is so mounted that it rests upon the rearward extension 60 of the tank and prevents entry of outside air into the combustion chamber or passageway 37 at this point, regardless of the particular positioning of the tank relative to the stack (Figs. 2 and 3).

The tank casting 50 is formed with a pair of depending bosses, one boss 65 being larger than the other boss 66 and arranged centrally of the tank block 51. This central boss 65 is formed with an opening to receive the upper end of a supporting post 67, there being suitable pin connections between said post and the boss. This post 67 is adapted for vertical sliding movement through a relatively long guide bearing 68 formed on the carriage frame 41 (Fig. 3), and is provided at its lower end with transversely aligned rollers 69 adapted to travel in guideways 70 in a cross head 71 fixed to the upper end of a vertically movable piston rod 72. An air motor 73 is arranged directly beneath the cross head 71 on a base 150 and is adapted at times to move the piston rod 72 vertically upward and thereby transmit a corresponding degree of vertical movement to the working tank 40. This cross head 71 is located between the trackways 42 along which the supporting carriage 41 travels (Fig. 5).

The other boss 66 is located rearwardly of the central boss 65 and is formed with a recess in which the upper end of a connector 75 is fixed. This connector 75 is free to slide through an externally threaded adjusting sleeve 76, the lower end of the connector having stop nuts 77 threaded thereon, by which upward movement of the connector 75 through the sleeve 76 is limited. The adjusting sleeve 76 is threaded in a boss 78 and is provided with a head at its upper end of such form that it may be engaged by a tool and rotated to raise or lower the sleeve and thereby vary the degree of vertical movement of the tank toward and from the head 35. By means of the construction just pointed out, raising and lowering of the working tank at proper intervals to any desired degree is permitted. Horizontal reciprocation of the working tank in timed relation with the vertical movements thereof is obtained by mounting an air motor 80 rearwardly of the carriage 41 and connecting the piston rod 81 of this motor to the rear end of the carriage 41 in any approved manner. Preferably, the piston rod 81 is connected to a rod 82 by a horizontal pin 83, said rod 82 in turn being fixed to a head 84 mounted on the carriage. Thus, it is seen that in the event the motor 80 is out of horizontal alignment with the connector rod 82, such dis-alignment will be compensated for by the swinging connection and proper movement of the tank will not be hampered. The motor 80 may be mounted between the tracks 42 upon a transversely curved support 86 fixed to adjacent ends of a pair of inwardly extending arms 85 whose outer ends are bolted or otherwise secured to spaced I-beams 87 which carry the tracks 42.

As a means for limiting relative movement between the motor 80 and the tank carrier 41, the head 84 is formed with a depending arm 90 fixed to the forward end of a slide rod 91 having its rear end sliding through a stop 92 which is preferably mounted upon the lower side of the motor 80. This slide rod 91 mounts a pair of spaced collars 93 which are adapted to alternately engage said stop 92 as the carriage 41 reciprocates, said collars being adjustable along the rod 91 to vary the extent of the tank reciprocation.

The air motors 73 and 80 are adapted to be operated in timed relation with movements of the forming machine (not shown), such operation being effected by any preferred type of automatic valves. In the form illustrated, there is provided an air pressure chamber 95 having an air inlet pipe 96 by which a constant air pressure is maintained within said chamber. Valves 97, normally closed by spring pressure or other means, are arranged in outlets communicating with pipe lines 98 and 99 leading to the air motors 80 and 73, respectively, which cause periodic reciprocation and elevation of the tank. Cams 100 mounted on a continuously rotating shaft 101 effect opening and closing of the valves in timed relation with the machine movements. This shaft 101 is driven by the motor which operates the forming machine (not shown).

During the periods that the tank 40 is covered by the hood 25, it is intended that the heat in the combustion chamber and passageway 37 shall reheat the chilled portions of glass in the gathering and cut-off receiving areas so that when the glass is next presented for a gather, such glass will be in the best possible condition.

An increase in the effectiveness of the heat within the combustion chamber 27 and passageway 37 is obtained by partly closing the damper 36 to thereby retard exhaust of the products of combustion through the stack to the atmosphere. This condition causes a slower movement of the products of combustion away from the combustion chamber to the stack and results in more intimate and prolonged contact between the products of combustion and the molten glass. The desired periodic operation of the damper 36 is obtained by fixing the upper end of a connecting rod 110 to a finger 111 attached to one end of a shaft 120 which carries the damper 36. This rod extends downwardly through a bearing 113 and has its lower end connected to a lever 114 which is periodically raised and lowered by a cam 117 mounted upon the tank 40. This lever 114 is substantially U-shaped and is journalled in a bearing 115 fixed to the hood supporting frame and carries a cam roll 116 which periodically rides over the face of an inclined cam 117 (Fig. 4). The connecting rod 110 is provided with a turn-buckle 118 permitting necessary adjustment of its length. A coil spring 112 surrounds the rod between the guide 113 and an adjustable nut 119, said spring serving to retain the damper in its uppermost position, which position is occupied during the gathering periods. With movement of the tank 40 to its innermost position, the cam 117 engages the cam roll 116, causing upward swinging of the lever 114 and upward movement of the connecting rod 110 and consequent lowering of the damper 36. During the periods in which the tank is in its innermost position and heat is applied to the cut-off receiving area, the cam 117 supports the connecting rod 110 in its uppermost position against the spring tension, causing downward movement or closing of the damper 36 to the necessary degree. Obviously, with outward movement of the tank 40, the cam is moved from beneath the lever 114 and the spring 112 is free to function, causing lowering of the connecting rod 110 and opening of the damper 36 to the former position.

During the charge gathering period, the damper is in its raised position and the draft resulting therefrom directs a great portion of heat along the ceiling of the passageway connecting the combustion chamber and stack, causing a very appreciable increase in the ceiling temperature. Partial closing of the damper while the tank is in its innermost position causes concentration of heat from the combustion chamber directly upon the forward area of the glass. Heat radiated from the ceiling of the passageway assists in maintaining the glass at the rear end of the tank in proper condition.

The operation of the apparatus is as follows:

Preferably, during the intervals between the charge gathering periods, the tank occupies a position beneath the hood 25 (Fig. 2) in which position the entire surface of the glass in the tank, including the chilled glass in the cut-off area, is subjected to heat treatment by the products of combustion which move from the combustion chamber 27 rearwardly through the passageway 37 to the stack 35. This movement of the products of combustion insures treatment of the entire surface of the glass. There is a continuous stream of fresh glass entering the tank 40 from the extension 16 of the furnace, regardless of the tank location. The rate of flow of the supply stream is controlled by adjusting the regulator 21 to vary the size of the opening 20. When a charge is to be gathered, the tank is caused to move outwardly bringing the gathering area "A" to the Fig. 3 position in which the glass surface comes into contact with a gathering mold "M". The mold may be held stationary as shown for example in my copending application Serial Number 192,232, filed May 18, 1927, which discloses a machine having a single gathering mold, stationary at all times except for its opening and closing movements. The mold "M" might also form a part of any one of the various types of machines in which the mold is periodically brot to the gathering position either by the rotation of a mold carriage or otherwise, and in which the mold is either held stationary or travels horizontally while gathering its charge but has no vertical movement to effect charge gathering positioning thereof. While the mold "M" is in the gathering position (Fig. 3), it gathers the charge or charges by suction. During this gathering operation, the lower side of the passageway 37 to the stack 35 is closed by the rearward extension 60 on the feeder tank 40, such construction preventing breaking up of proper draft conditions. Immediately following the charge gathering operation, the motor 80 is automatically operated to move the tank 40 inwardly toward the heating position and simultaneously with this inward movement or perhaps slightly in advance thereof, the air pressure beneath the piston (not shown) in the tank lifting air motor 73 is released so that the tank, due to its own weight, moves downward away from the mold (Figs. 5, 6 and 7). This compound movement of the tank 40, together with the properly timed operation of the cut-off "C" (Figs. 7 and 8) causes a deposit of the chilled stringy glass or tail into the cut-off area 105. The motor 80 continues to operate during the movement of the tank 40 downward and away from the mold "M" and at the proper time interval, air pressure is again introduced into the motor 73 below the piston (not shown) causing the elevation of the tank to the position shown in Fig. 2 wherein the entire glass surface, including the chilled cut-off portions, are subjected to heat treatment. As has been pointed out heretofore, longitudinal movement of the tank 40 is limited by the adjustable collars 93 on the rod 91 and by adjustment of the cams 100 about the shaft 101 which causes opening and closing of the valves 97 by which the supply of air pressure to the motor 80, as well as to the lifting motor 73, is regulated.

Relative vertical movement between the carriage 41 and the tank 40 is readily varied by adjustment of the sleeve 76 (Fig. 3). By lowering the sleeve 76, the degree of upward movement of the tank away from the carriage 41 will be lessened so that there will be a variance in the spacing between the body of molten glass and the hood 25. This adjustment also controls the extent to which the mold "M" dips into the molten glass.

In another form of the invention shown in Figs. 10 to 13, inclusive, the glass working tank 40 containing the molten glass from which charges are periodically gathered by suction, remains stationary in its outermost position during a series of gathering operations and at intervals is brought back beneath the hood 25 so that the glass may be heat treated. The tank is constantly supplied with fresh glass from the furnace 126 by way of a trough 125. This tank 40 is provided near the front ends of its side walls with upwardly raised portions forming guards or deflectors 127 serving to prevent spilling of glass over the sides of the tank as will be pointed out hereinafter. These guards are formed with notches 128 in which supporting arms 129 are seated, said arms carrying a transverse dam 130 which divides the tank into a gathering area 131 and a cut-off receiving area 132. The working tank is arranged below and in proximity to a hood 25 and stack 35 which together cover the entire glass surface when the tank is in its innermost position. The hood 25 is provided with a combustion chamber 27 to which fuel is supplied by an injector 133. The front end of the wall 28 of the combustion chamber 27 terminates at a point spaced a considerable distance above the glass surface and dam 130, forming a forwardly and downwardly extending opening 133' providing for the application of products of combustion directly to the chilled portions of glass which are pushed over the dam, as will be brought out hereinafter. The side walls 140 of said opening 133' extend forwardly beyond the ceiling of the combustion chamber and provide guards preventing movement of the heat laterally away from the molten glass.

The chilled glass including that severed from the mold "M" after each gather, is removed from the gathering area by a paddle or pusher 134 located slightly in advance of the dam 130 and between the forwardly extending side walls 140. The lower end of this paddle periodically moves in the path indicated by the dot and dash line (Fig. 10), causing movement of the chilled glass over the dam 130 and into the cut-off receiving area 132 wherein the glass is subjected to proper heat treatment and is completely re-assimilated by the main body of glass before returning to the gathering area 131. This paddle or pusher 134 is fixed to the lower end of a piston rod 135, said rod being periodically reciprocated by an air motor 136 to which air pressure is periodically supplied by a pressure tank 137 and causing vertical movement of the paddle. A second air motor 138, receiving its air pressure from the tank 137, has its piston 139 connected to the housing of the first named air motor 136 and is operated in proper timed relation with movements of the paddle supporting piston rod 135, to transmit to the dipping end of said paddle horizontal movement similar to those indicated by the dot and dash line (Fig. 10).

Any approved means (not shown) may be empoyed to regulate the passage of air pressure from the pressure chamber 137 to the two air motors 136 and 138 in such timed relation with movement of the gathering mold "M" that the paddle 134 will operate during the intervals between the gathering periods and thereby insure clearing the gathering area of chilled glass just prior to each gathering operation. The molten glass is prevented from spilling over the sides of the tank under influence of the paddle movements by the guards 127.

A damper 39 is arranged over the upper end of the stack 35 and may be operated by any approved mechanism to control draft conditions and thereby vary the intensity and effectiveness of the heat within the hood 25.

In operation, the tank 40 is moved forward by any approved mechanism (not shown) to expose the gathering area 131 so that charges of molten glass may be gathered by a forming mold. During the intervals between the gathering periods, the air motors operate to move the paddle as stated, causing pushing of chilled glass over the dam into the cut-off receiving area 132. Between the operating periods of the paddle, said paddle serves to close the front end of the combustion chamber, causing direct downward movement of the products of combustion upon the glass. From time to time, the tank is moved to a position beneath the hood 25 so that the glass in proximity to and over the dam may be effectively heat treated and so conditioned that it may be gathered into the forming molds.

Manifestly, certain minor changes may be resorted to within the spirit and scope of the appended claims.

What I claim is:

1. In combination, a stationary suction mold, a hood including heating means spaced horizontally from said mold, a tank to contain molten glass arranged beneath said hood and mold, means constantly supplying fresh glass to the tank, means for reciprocating said tank to periodically expose a portion of the glass surface to the atmosphere, and means operating in timed relation with the tank reciprocating means to elevate the tank and bring the glass into charge gathering engagement with the mold.

2. In combination, a stationary suction mold, a hood including heating means spaced horizontally from said mold, a tank to contain molten glass arranged beneath said hood and mold, means constantly supplying fresh glass to the tank, means for reciprocating said tank to periodically expose a portion of the glass surface to the atmosphere, means operating in timed relation with the tank reciprocating means to elevate the tank and bring the glass into charge gathering engagement with the mold, and means operable to vary the degree of elevation of said tank.

3. In combination, a mold, a tank to contain molten glass, means constantly supplying fresh glass to said tank, means for reciprocating said tank to and away from a station below said mold, and means for elevating the tank at said station to bring the glass into charge gathering engagement with the mold.

4. In combination, a mold, a tank to contain molten glass, means constantly supplying fresh glass to said tank, means for reciprocating said tank to and away from a station below said mold, means for elevating the tank at intervals to bring the glass into charge gathering engagement with the mold, and adjustable means for varying the degree of elevation of said tank.

5. In combination, a stationary suction mold, a tank to contain molten glass, a dam arranged to divide the tank into the gathering area and a cut-off receiving area, means causing periodic movement of the tank to bring the gathering area into charge gathering engagement with said mold and for then moving the tank laterally and downwardly from the mold, and means operating in timed relation with movement of the tank to sever chilled portions of the glass from the mold and deposit said portions in the cut-off receiving area.

6. In combination, a stationary suction mold, a tank to contain molten glass, a dam arranged to divide the tank into the gathering area and a cut-off receiving area, means causing periodic movement of the tank to bring the gathering area into charge gathering engagement with said mold and for then moving the tank laterally and downwardly from the mold, means operating periodically to sever chilled portions of the glass from the mold and deposit said portions in the cut-off receiving area, and means for varying the degrees of movement between said tank and mold.

7. In combination, a tank to contain molten glass, a hood adapted at times to entirely cover the glass, means for applying heat to said glass from within the hood, means for reciprocating the tank periodically to expose a portion of the glass to the atmosphere, and means causing vertical movement of the tank in timed relation with the reciprocating movement.

8. In combination, a tank to contain molten glass, a hood adapted at times to entirely cover the glass, means for applying heat to said glass from within the hood, means for reciprocating the tank periodically to expose a portion of the glass to the atmosphere, means causing vertical movement of the tank in timed relation with the reciprocating movement, and means to change the relative degrees of the reciprocating and vertical movements of the tank.

9. In combination, a tank to contain molten glass, means constantly supplying fresh glass to the tank, a carriage supporting said tank, means providing vertical movement of the tank relative to the carriage, means for reciprocating the carriage, means causing vertical movement of the tank over the carriage, and a regulator controlling the relative operating periods of said carriage and tank moving means.

10. In combination, a tank to contain molten glass, a carriage arranged below and supporting said tank, means permitting vertical movement of the tank relative to the carriage, an adjustable device for controlling the degree of movement between the carriage and tank, and automatic means operable to reciprocate the carriage and tank as a unit in timed relation to the vertical movements of the tank.

11. In combination, a tank to contain molten glass, a carriage arranged below and supporting said tank, means permitting vertical movement of the tank relative to the carriage, an adjustable device for controlling the degree of movement between the carriage and tank, automatic means operable to reciprocate the carriage and tank as a unit, and means automatically operable to move the tank vertically in timed relation with the reciprocating movements.

12. A tank to contain molten glass, a carriage arranged below and supporting the tank, a motor arranged to periodically reciprocate the tank along a predetermined path, and means operating periodically in timed relation with operation of the motor to move the tank vertically with respect to the carriage.

13. A tank to contain molten glass and having a gathering area from which charges are periodically gathered, a carrier arranged below said tank, means interconnecting the tank and carrier permitting relative vertical sliding movement therebetween, means for periodically effecting such movement, and means for periodically moving all portions of the tank in the same lateral direction in timed relation to said vertical movements.

14. A tank to contain molten glass and having a gathering area from which charges are periodically gathered, a carrier arranged below said tank, means interconnecting the tank and carrier permitting relative vertical sliding movement therebetween, an adjustable connector operating to limit the extent of relative movement between said tank and carrier, and means operating automatically to periodically reciprocate the tank and carrier horizontally.

15. In combination, a reciprocable tank to contain molten glass, said tank having a gathering area from which charges are periodically gathered, a hood arranged over said tank, means within the hood for heating the glass, a stack arranged rearwardly of the heating means and connected to the latter by a passageway, and an extension on one end of the tank adapted at times to form the lower wall of said passageway.

16. In combination, a reciprocable tank to contain molten glass from which charges are periodically gathered, heating means located above the glass, a stack adjacent the heating means, a damper for said stack, and means actuated by movement of the tank to vary the effectiveness of the damper.

17. In combination, a reciprocable tank to contain molten glass from which charges are periodically gathered, heating means located above the glass, a stack adjacent the heating means, a damper for said stack, a cam carried by the tank, and means actuated by the cam to change the position of the damper to thereby vary draft conditions.

18. A glass working tank to contain molten glass, a removable dam extending across the tank to divide the tank into charge gathering and cut-off receiving areas, and supporting arms formed on the dam and resting upon opposed walls of the tank.

19. A glass working tank to contain molten glass, a removable dam extending across the tank to divide the tank into charge gathering and cut-off receiving areas, supporting arms formed on the dam and resting upon opposed walls of the tank, and releasable clamps carried by the tank and engaging said arms, preventing displacement of the dam.

20. In combination, a glass working tank to contain molten glass from which charges are periodically gathered, means operating to periodically reciprocate the tank toward and from a charge gathering station, and means operating in timed relation with operation of the reciprocating means to alternately raise and lower the tank as it moves toward and from said station.

21. In combination, a mold, a tank to contain a supply body of molten glass, means for reciprocating said tank to and away from a station below said mold, and means for elevating the tank at said station to bring the glass into charge gathering engagement with the mold.

22. In combination, a stationary suction blank mold, a container for molten glass arranged in a plane below said mold, a cover for the container, means to reciprocate said container along a path whose ends terminate below the mold and cover, and means to elevate the tank at the opposite ends of said path to thereby bring the glass into charge gathering engagement with the mold and into position for enclosure by the cover, in alternation.

23. A tank to contain molten glass and having a gathering area from which charges are periodically gathered, a carrier arranged below said tank, means interconnecting the tank and carrier permitting relative vertical sliding movement therebetween, means for periodically sliding the tank vertically with respect to the carrier, an adjustable connector operating to limit the extent of relative movement between said tank and carrier, and a motor having operating connections with the tank and adapted to move all portions of the tank in the same horizontal direction.

Signed at Toledo, in the county of Lucas and State of Ohio, this 21st day of January 1927.

LEONARD D. SOUBIER.